United States Patent Office

2,917,367
Patented Dec. 15, 1959

2,917,367

PURIFYING CRUDE PHOSPHORIC ACID

William A. Hodges, Plant City, Fla., and Joseph E. Floyd, Lansing, Ill., assignors to Swift & Company, Chicago, Ill., a corporation of Illinois No Drawing. Application January 22, 1957
Serial No. 635,089

2 Claims. (Cl. 23—165)

The present invention relates in general to the production of concentrated phosphoric acid. More specifically, this invention relates to a method for clarifying crude phosphoric acid which has been formed through the acidulation of phosphate rock with sulfuric acid (the "wet process") whereby to form a concentrated phosphoric acid relatively free from solid impurities.

Phosphoric acid as produced through the acidulation of phosphate rock with sulfuric acid contains fairly large quantities of material of an inert nature such as calcium sulfate, sodium sulfate and sodium silico fluoride. These impurities, if left in the phosphoric acid so produced, act as diluents and when the acid, as is customary, is used in the manufacture of triple superphosphate these inert materials serve no function whatsoever in the superphosphate. Also, they increase transportation costs and cause further difficulties if the acid is shipped due to the fact that these solids may settle out in the tank cars.

Accordingly, it is an object of this invention to provide a process for the production of a concentrated relatively pure phosphoric acid.

It is another object of this invention to provide a method for the removal of inert solids from concentrated phosphoric acid which has been produced through the acidulation of phosphate rock (the wet process).

A further object of this invention is to prepare a stronger phosphoric acid from phosphate rock, an acid which does not contain appreciable quantities of such diluents as sodium silico fluoride, calcium sulfate, and sodium sulfate.

Still another object of this invention is to provide a method for forming concentrated phosphoric acid, which is especially suitable for use in making high analysis superphosphates for use in fertilizer.

Broadly, this invention is a result of the discovery that crude dilute phosphoric acid prepared by the "wet process" must first be treated to remove the fluoride ions and thereafter concentrated at a vacuum within a specific range if pure concentrated acid is to be ultimately obtained. The crude phosphoric acid is that obtained by reacting sulfuric acid and phosphate rock and is prepared for concentration by first being subjected to a defluorination operation. A preferred approach to this is the method set forth in U.S. Patent No. 2,883,266 directed to Sodium Silico Fluoride Manufacture. The main portion of the sodium silico fluoride is effectively removed in this fashion. Small amounts of sodium silico fluoride, calcium sulfate and sodium sulfate, however, remain as diluents. The acid, which is at this point in a rather weak and dilute condition, is concentrated by evaporation at an absolute pressure of 7 inches Hg to 25 inches Hg for a time sufficient to remove any or all of the water present. The concentrated acid is then suitable for filtration.

More specifically, crude phosphoric acid obtained by reacting sulfuric acid and phosphate rock in the well known fashion contains relatively large quantities of impurities which act as diluents. These materials remain in solution for the most part while the acid is in a dilute state but after concentration tend to precipitate and form a slurry. The slurry is not ordinarily filterable and hence a pure concentrated acid is difficult to obtain. In accordance with this invention, the bulk of the fluoride ions are first removed in any convenient fashion, e.g., as sodium silico fluoride in accordance with the method set forth in the aforementioned U.S. Patent No. 2,883,266. When using this method, fluoride impurities are precipitated as sodium silico fluoride by addition to the weak crude acid of a mixture of sodium hydroxide and sodium silicate. This causes the formation of a flocculent sodium silico fluoride which precipitates on standing. The weak acid may be separated from the precipitate by decantation or, in the alternative, the sodium silico fluoride may be filtered out. This defluorination step, however, does not remove all of the fluoride ions. Evaporation is necessary to remove water and form a more concentrated phosphoric acid and at this time additional solids are precipitated due to the added concentration effected by the removal of such water. The solids are mainly the sodium and calcium salts of hydrofluosilicic acid, sodium silicate and calcium sulfate. These compounds, if not removed, constitute diluents in the final concentrated acid. Where the acid is used in the manufacture of triple superphosphate, they serve no function whatsoever in the final product. As pointed out earlier, the dilutants increase costs by increasing the transportation cost per unit $P_2O_5$ and tend to precipitate out in tank cars in which the acid may be shipped.

It has been found that these flocculent diluents in concentrated crude defluorinated acid may be directly filtered out only with great difficulty where the acid is concentrated in the vicinity of atmospheric pressure or at extremes of vacuum. Only when a limited range of pressures is employed may the solid materials in the slurry be readily filtered. Specifically, it has been found that a gauge pressure of between 25" Hg maximum and 7" Hg minimum should be employed during the concentrating operation if the resultant slurry is to be easily filtered. Where an attempt is made to heat and concentrate at more than 25" pressure a low heating efficiency is encountered and considerable acid may be vaporized and lost as a mist. Where low pressures are employed, less than 7" Hg, the rate of filtration becomes excessively low. This will be seen in the tables which follow.

The tests which are detailed below were made by evaporating defluorinated (in accordance with the method of U.S. Patent No. 2,883,266) production phosphoric acid in a 2000 ml. balloon flask using a laboratory model rotary vacuum pump to supply the vacuum. The concentrated acid was cooled to 65° C. and filtered through a 4 inch stainless steel Büchner type funnel using a fritted stainless steel filter medium. The acid was analyzed for $P_2O_5$ before concentration and after concentration and filtration. As can be seen, the results show the rate of filtration increases as the concentrating temperature and pressure increase.

Table 1

|  | Test Number | | |
|---|---|---|---|
|  | 1 | 2 | 3 |
| Defluorinated Acid, ml | 1,000 | 1,000 | 1,000 |
| Defluorinated Acid, $P_2O_5$ | 28.81 | 28.81 | 28.81 |
| Evap. pressure, inches Hg | 3 | 7 | 12 |
| Max. Evap. Temp., °C | 120 | 132 | 160 |
| Filtration Vacuum, inches Hg | 27.7 | 26.7 | 26 |
| Filtration Temp., °C | 65 | 65 | 65 |
| Filtration Time, Sec | 600 | 205 | 180 |
| Filtration Time, Percent Reduc | | 65.8 | 70.0 |
| Filtered Acid, ml | 330 | 340 | 330 |
| Filtered Acid, $P_2O_5$ | 61.98 | 60.34 | 62.49 |

Table 2

|  | Test Number | | |
|---|---|---|---|
|  | 1 | 2 | 3 |
| Defluorinated Acid, ml | 800 | 800 | 800 |
| Defluorinated Acid, $P_2O_5$ | 28.81 | 28.81 | 28.81 |
| Evap. Pressure, inches Hg | 2.5 | 3 | 7.5 |
| Max. Evap. Temp., °C | 85 | 97 | 122 |
| Filtration Vacuum, inches Hg | 25.7 | 25.7 | 25.7 |
| Filtration Temp., °C | 65 | 65 | 65 |
| Filtration Time, Sec | 70 | 38 | 27 |
| Filtration Time, Percent Reduc | | 47 | 61.5 |
| Filtered Acid, ml | 300 | 300 | 300 |
| Filtered Acid, $P_2O_5$ | 57.51 | 56.70 | 56.13 |

Table 2a

|  | Test Number | | |
|---|---|---|---|
|  | 4 | 5 | 6 |
| Defluorinated Acid, ml | 800 | 800 | 800 |
| Defluorinated Acid, $P_2O_5$ | 28.81 | 28.81 | 28.81 |
| Evap. Pressure, inches Hg | 21 | 25 | 30 |
| Max. Evap. Temp., °C | 131 | 138 | 147 |
| Filtration Vacuum, inches Hg | 25.7 | 25.7 | 25.7 |
| Filtration Temp., °C | 65 | 65 | 65 |
| Filtration Time, Sec | 16 | 13 | 10 |
| Filtration Time, Percent Reduc | 79.7 | 81.5 | 85.7 |
| Filtered Acid, ml | 300 | 300 | 300 |
| Filtered Acid, $P_2O_5$ | 57.12 | 56.54 | 56.98 | free acid (not reacted). The results of the tests are set forth below:

Table 3

| | |
|---|---|
| $P_2O_5$ in rock | 34.07 |
| $P_2O_5$ of acid: | |
| T—unfiltered | 49.27 |
| C—filtered | 54.20 |
| Percent Solids in acid (unfiltered) | 9.00 |
| Temperature of acid for acidulating °F | 150 |

1. ANALYSIS AFTER 24 HOUR CURE

| No. | Wt. Ratio, Rock/acid | $P_2O_5$ ratio, Rock/acid | $H_2O$ | APA | IPA | TPA | FA |
|---|---|---|---|---|---|---|---|
| 1T | 0.55/1.00 | 1.00/2.25 | 15.56 | 42.00 | 2.31 | 44.31 | 19.06 |
| 2C | 0.60/1.00 | 1.00/2.25 | 15.95 | 44.26 | 2.35 | 46.31 | 15.30 |
| 5T | 0.516/1.00 | 1.00/2.83 | 16.87 | 41.75 | 2.26 | 44.01 | 19.16 |
| 6C | 0.567/1.00 | 1.00/2.83 | 17.55 | 44.35 | 2.21 | 46.56 | 17.15 |

2. ANALYSIS AFTER 2 WEEK CURE

| No. | | | $H_2O$ | APA | IPA | TPA | FA |
|---|---|---|---|---|---|---|---|
| 1T | | | 12.44 | 44.98 | 0.43 | 45.21 | 3.86 |
| 2C | | | 10.28 | 46.60 | 0.74 | 47.34 | 4.25 |
| 5T | | | 14.52 | 43.98 | 0.34 | 44.32 | 4.99 |
| 6C | | | 14.17 | 46.69 | 0.46 | 47.15 | 5.73 |

As can be seen from the foregoing the triple superphosphate obtained where filtered acid is used is in many respects superior to that made with unfiltered phosphoric acid because of the presence of 9% solids in the latter. As seen in the first two tables, improved results in filtering are obtained where a pressure greater than about 7 inches of mercury is employed. Concentration pressures in the neighborhood of the atmospheric level are objectionable, in addition to the reasons given earlier, because the materials of construction for the concentrating vessels used where atmospheric pressures are employed (and high temperatures are necessitated) are much more expensive than those employed where a vacuum can be drawn (and lower temperatures used). High temperatures plus corrosive liquids invariably necessitate costly containers.

Finally, more tests were run to show the importance of a defluorination operation prior to concentration. As can be seen from the data below, the filtration rate where no preliminary defluorination was practiced was, in each case, far less than that observed where the bulk of the fluoride ions were removed from the weak acid solution prior to concentration.

Table 4
LABORATORY FILTRATION TESTS ON FINISHED ACID

| Test No.: | | Inches Hg Press. | Max. Temp., °C. | Sp. Gr. F. A. Slurry | Sp. Gr. Fil. F. A. | $P_2O_5$ Fil. F. A. | Filtration Temp., °C. | Fil. Rate (Gal./hr. ft.²) | Percent of Slurry as wet Unwashed Cake |
|---|---|---|---|---|---|---|---|---|---|
| 1 | Regular defluorinated | 7 | | 1.728 | 1.691 | 52.01 | 60 | 23 | 9.1 |
|   |   | 7 | | 1.733 | 1.700 | 52.13 | 60 | 119 | 12.1 |
| 3 | do | 7.5 | | 1.817 | 1.772 | 59.20 | | 67 | 15.4 |
|   |   | 7.5 | | 1.827 | 1.778 | 58.30 | | 315 | 15.0 |
| 4 | do | 7.5 | 115 | 1.827 | 1.782 | 56.30 | 65 | 72 | 8.7 |
|   |   | 7.5 | 110 | 1.803 | 1.777 | 56.16 | 70 | 332 | 9.2 |
| 5 | do | 7 | 100 | 1.681 | 1.676 | 49.40 | 75 | 307 | 5.8 |
|   |   | 7 | 100 | 1.693 | 1.687 | 49.43 | 70 | 563 | 7.3 |
| 6 | do | 6.5 | 135 | 1.930 | 1.833 | 63.09 | 85 | 1 | 32.5 |
|   |   | 6.5 | 137 | 1.982 | 1.894 | 63.05 | 90 | 41 | 21.2 |
| 7 | do | 6.5 | 110 | 1.764 | 1.738 | 57.55 | 70 | 17 | 16.3 |
|   |   | 6.5 | 112 | 1.813 | 1.779 | 58.29 | 70 | 55 | 16.3 |

To more specifically point up the advantages to be secured by removing the materials which begin to precipitate when crude phosphoric acid is concentrated, further tests were run comparing filtered and unfiltered concentrated phosphoric acid produced by acidulating phosphate rock with sulfuric acid. The acid selected in each case, whether filtered or unfiltered, was defluorinated and was used in the preparation of triple superphosphate. In the table, APA refers to available phosphoric acid, IPA refers to insoluble phosphoric acid, TPA refers to total phosphoric acid and FA refers to The invention, involving as it does, a method for freeing phosphoric acid of impurities, is effective to prepare acid of any given degree of concentration. After a particular degree Baumé has been selected, it is simply necessary to halt the concentration operation at the proper point.

Apparatus for concentrating and filtering such materials as phosphoric acid are well known and hence will not be described here.

Obviously, many modifications and variations may be made in the invention as hereinbefore set forth without departing from the spirit and scope thereof, and therefore only such limitations should be imposed as are indicated in the appended claims.

We claim:

1. A method of treating crude dilute phosphoric acid produced by acidulating phosphate rock whereby to produce a concentrated acid comprising: treating crude dilute phosphoric acid so formed to remove the bulk of the fluoride ions from said crude dilute acid; separating said fluoride ions from said crude dilute acid; concentrating said crude dilute acid at an elevated temperature at an absolute pressure of between about 7" and 25" Hg whereby to produce a filterable slurry containing concentrated phosphoric acid and filtering said slurry whereby to obtain purified concentrated phosphoric acid.

2. A method of removing solid material from crude phosphoric acid produced by acidulating phosphate rock which comprises: treating crude phosphoric acid so formed with a sodium hydroxide-sodium silicate solution whereby to precipitate sodium silico fluoride from said phosphoric acid; removing said sodium silico fluoride from said acid; subjecting said partially clarified acid to an absolute pressure between about 7" and 25" Hg and simultaneously therewith applying heat to evaporate water whereby to concentrate said acid and precipitate solid material therefrom; and thereafter filtering said concentrated acid whereby to remove said precipitated solid materials and produce a purified concentrated phosphoric acid.

References Cited in the file of this patent

UNITED STATES PATENTS

| | | |
|---|---|---|
| 1,487,205 | Carothers et al. | Mar. 18, 1924 |
| 1,597,984 | La Bour | Aug. 31, 1926 |
| 1,648,137 | Larison | Nov. 8, 1927 |
| 1,688,822 | Maxwell et al. | Oct. 23, 1928 |
| 1,858,203 | Fiske et al. | May 10, 1932 |
| 2,124,729 | Castner et al. | July 26, 1938 |
| 2,165,100 | Hettrick | July 4, 1939 |